United States Patent
Riddiford et al.

(10) Patent No.: US 7,401,867 B2
(45) Date of Patent: Jul. 22, 2008

(54) DYNAMIC IDENTIFICATION OF BRAKE-BY-WIRE COMPONENTS

(75) Inventors: Bryan P. Riddiford, Dayton, OH (US);
Jeff A. Foust, Eaton, OH (US); Robert J. Disser, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 159 days.

(21) Appl. No.: 11/087,832

(22) Filed: Mar. 23, 2005

(65) Prior Publication Data
US 2006/0214501 A1    Sep. 28, 2006

(51) Int. Cl.
*B60T 13/66* (2006.01)
*B60T 15/14* (2006.01)

(52) U.S. Cl. ........................................ 303/20

(58) Field of Classification Search ............... 303/15, 303/20, 199; 701/32
See application file for complete search history.

(56) References Cited

U.S. PATENT DOCUMENTS

| | | | |
|---|---|---|---|
| 6,412,880 B1 * | 7/2002 | Knechtges et al. | 303/20 |
| 6,749,269 B1 * | 6/2004 | Niwa | 303/20 |
| 6,991,302 B2 * | 1/2006 | Nilsson et al. | 303/20 |
| 2002/0035428 A1 * | 3/2002 | Baeuerle | 701/114 |
| 2005/0161298 A1 * | 7/2005 | Nilsson et al. | 188/290 |

* cited by examiner

*Primary Examiner*—Thomas J Williams
(74) *Attorney, Agent, or Firm*—Scott A. McBain

(57) ABSTRACT

A method of initializing a brake-by-wire system is provided. The method includes connecting multiple braking actuators to a controller to allow for communication between the braking actuators and the controller. The braking actuators are associated with one or more wheels of a vehicle. Subsequent to connecting the multiple braking actuators to a controller, the method includes dynamically assigning a primary identifier to the braking actuators using the controller.

20 Claims, 7 Drawing Sheets

DYNAMIC IDENTIFICATION OF BRAKE-BY-WIRE COMPONENTS

TECHNICAL FIELD

The present application relates generally to brake-by-wire systems, and more particularly to identification of braking actuators.

BACKGROUND

Automotive vehicles have been produced or demonstrated with brake systems that modulate brake force during stops to provide anti-lock brake control (ABS) and/or that modulate brake force during vehicle acceleration to provide positive acceleration traction control (TCS). Some such brake systems additionally provide brake-by-wire control.

Typically, brake systems having brake-by-wire control include braking actuators that are pre-programmed with a specific network identification or set of identifications prior to their assembly to the vehicle. For human identification, the actuators and related components are specially keyed, color-coded and/or separated by a large distance to minimize potential for cross-wiring during installation and assembly of the vehicle.

SUMMARY

In an aspect, a method of initializing a brake-by-wire system is provided. The method includes connecting multiple braking actuators to a controller to allow for communication between the braking actuators and the controller. The braking actuators are associated with one or more wheels of a vehicle. Subsequent to connecting the multiple braking actuators to a controller, the method includes dynamically assigning a primary identifier to the braking actuators using the controller.

In another aspect, a brake-by-wire system for a vehicle including wheels and one or more braking actuators associated with one or more of the wheels is provided. The brake-by-wire system includes a first braking actuator, a second braking actuator, a power source connected to the first and second braking actuators and a controller connected to the power source. The controller is configured to selectively identify the first and second braking actuators using the power source and to assign a primary identifier to each of the first and second braking actuators for use in selectively controlling the first and second braking actuators.

The details of one or more embodiments are set forth in the accompanying drawings and the description below. Other features, objects, and advantages will be apparent from the description and drawings, and from the claims.

DETAILED DESCRIPTION

Figure 1:
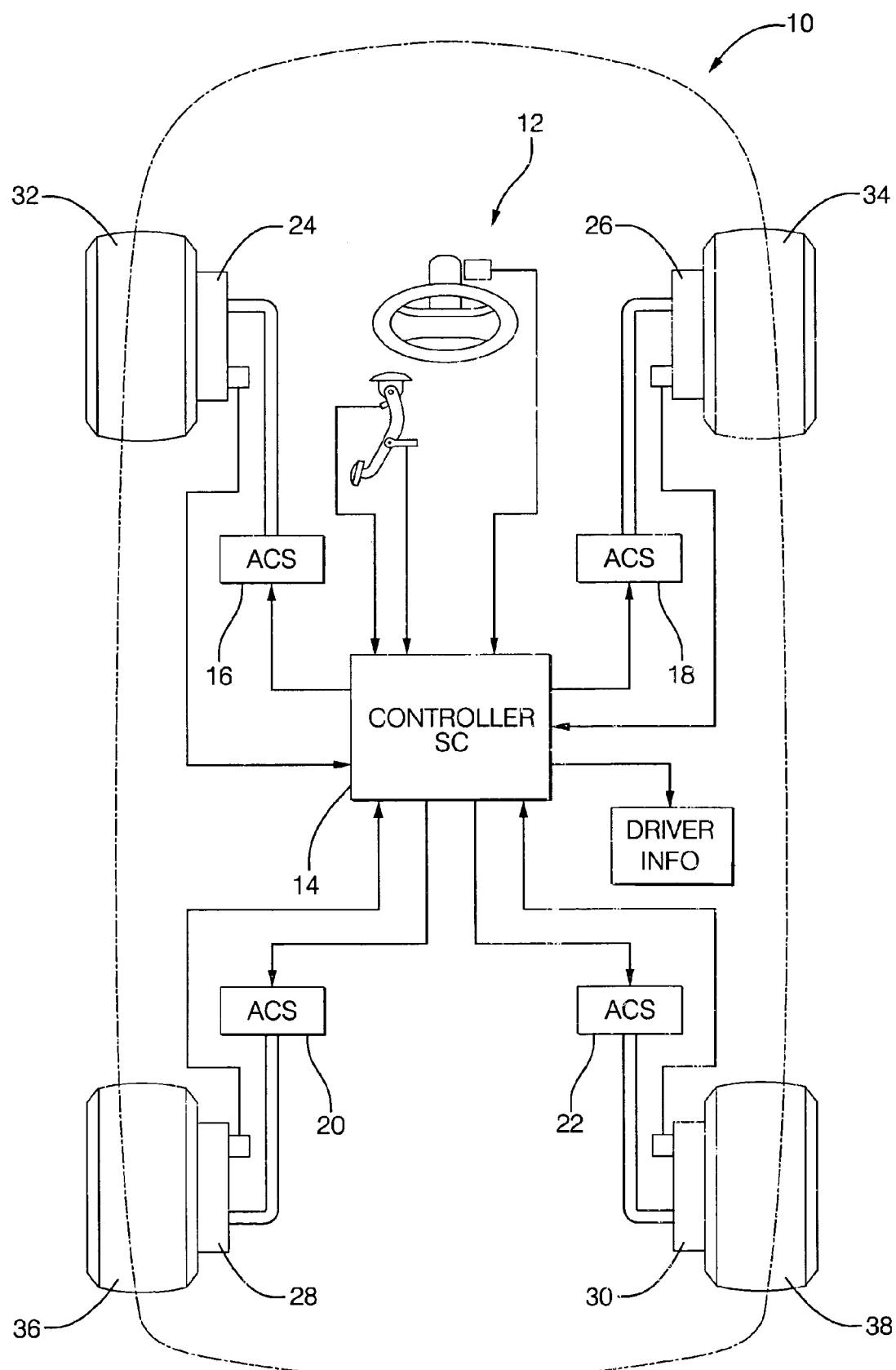
FIG. 1 is a diagrammatic illustration of an embodiment of a vehicle including a brake-by-wire system.

Referring to FIG. 1, a vehicle 10 includes a controllable brake system 12 with a controller 14 for controlling braking actuators (ACS, Actuator Control Subsystem) 16, 18, 20 and 22 and associated brakes 24, 26, 28 and 30. As will be described in greater detail below, the brake system 12 is self-initializing in that it dynamically assigns unique identifiers to each of the braking actuators 16, 18, 20 and 22, e.g., after the vehicle has been assembled or after vehicle maintenance. These identifiers can be used to selectively route control signals from the controller 14 to the braking actuators 16, 18, 20 and 22. While FIG. 1 illustrates a car having four wheels 32, 34, 36 and 38, it should be noted that the brake system described herein can be employed on other vehicles, such as vehicles having more than four wheels, such as six wheels, eight wheels, ten wheels, twelve wheels, sixteen wheels, eighteen wheels, etc., on other vehicle types such as aircraft, trucks including trailers, heavy machinery etc., and on vehicles having multiple actuators assigned to a single wheel or wheels.

Figure 2:
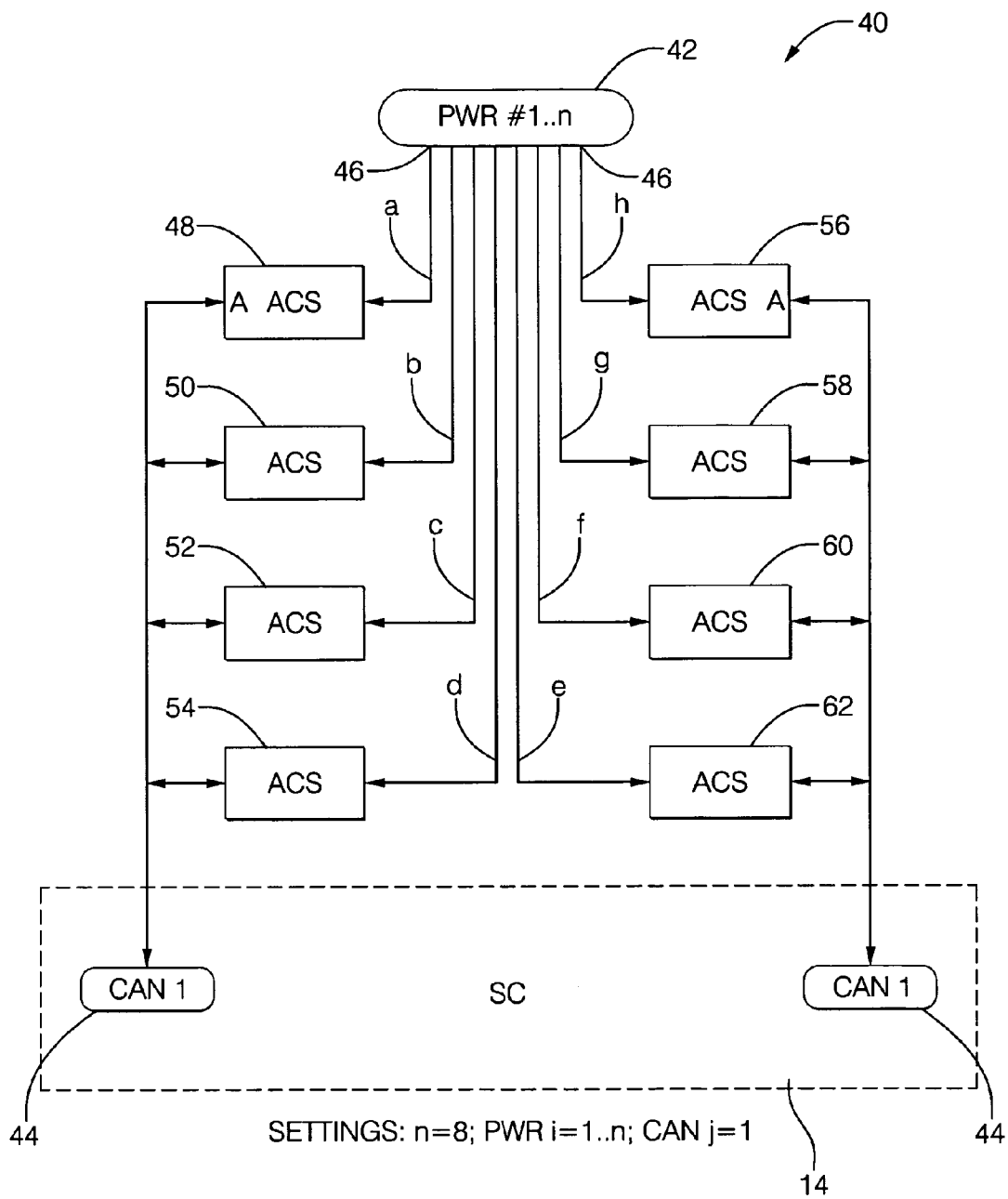
FIG. 2 is a diagrammatic illustration of an embodiment of a brake-by-wire system architecture.
Figure 3:
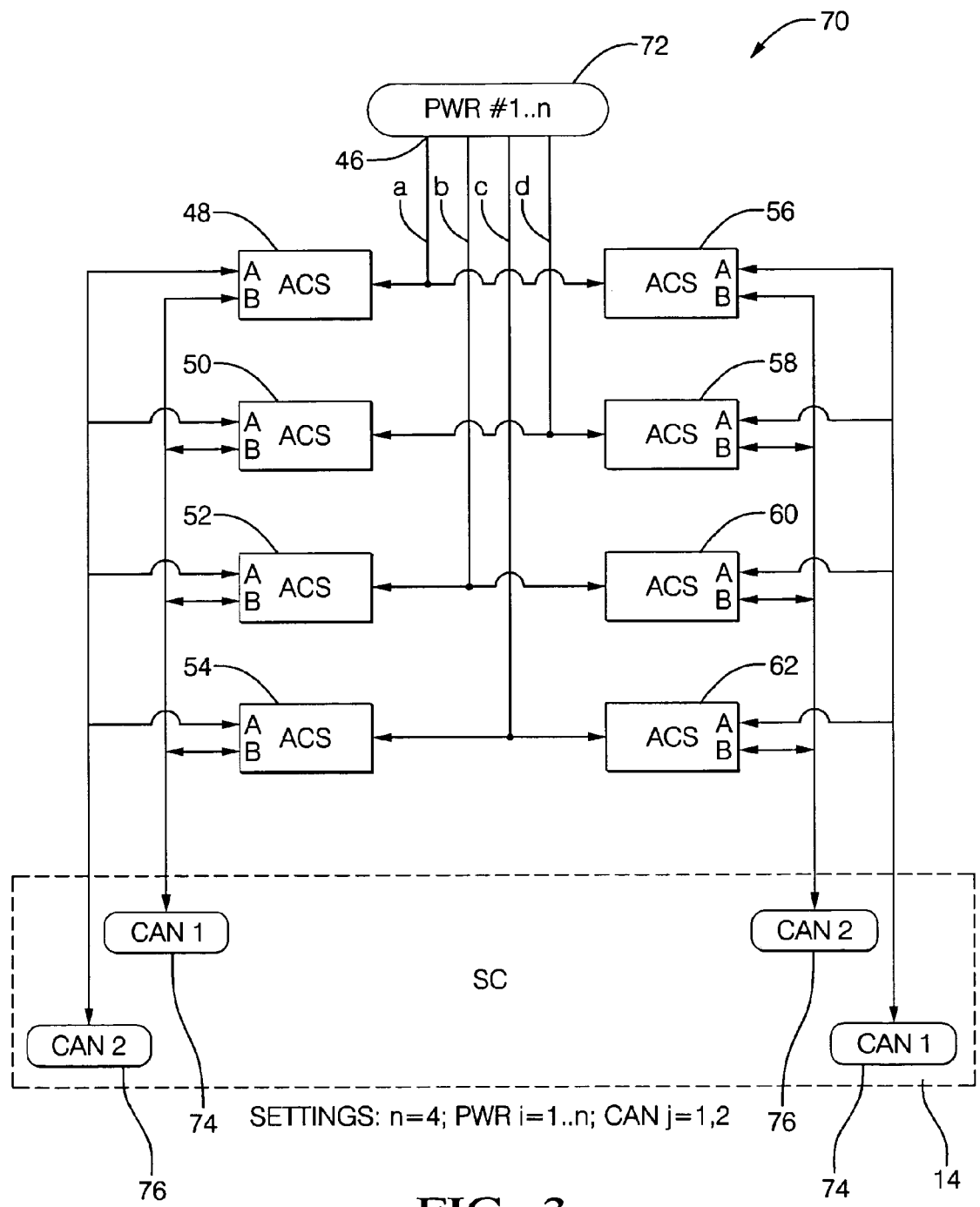
FIG. 3 is a diagrammatic illustration of another embodiment of a brake-by-wire system architecture.
Figure 4:
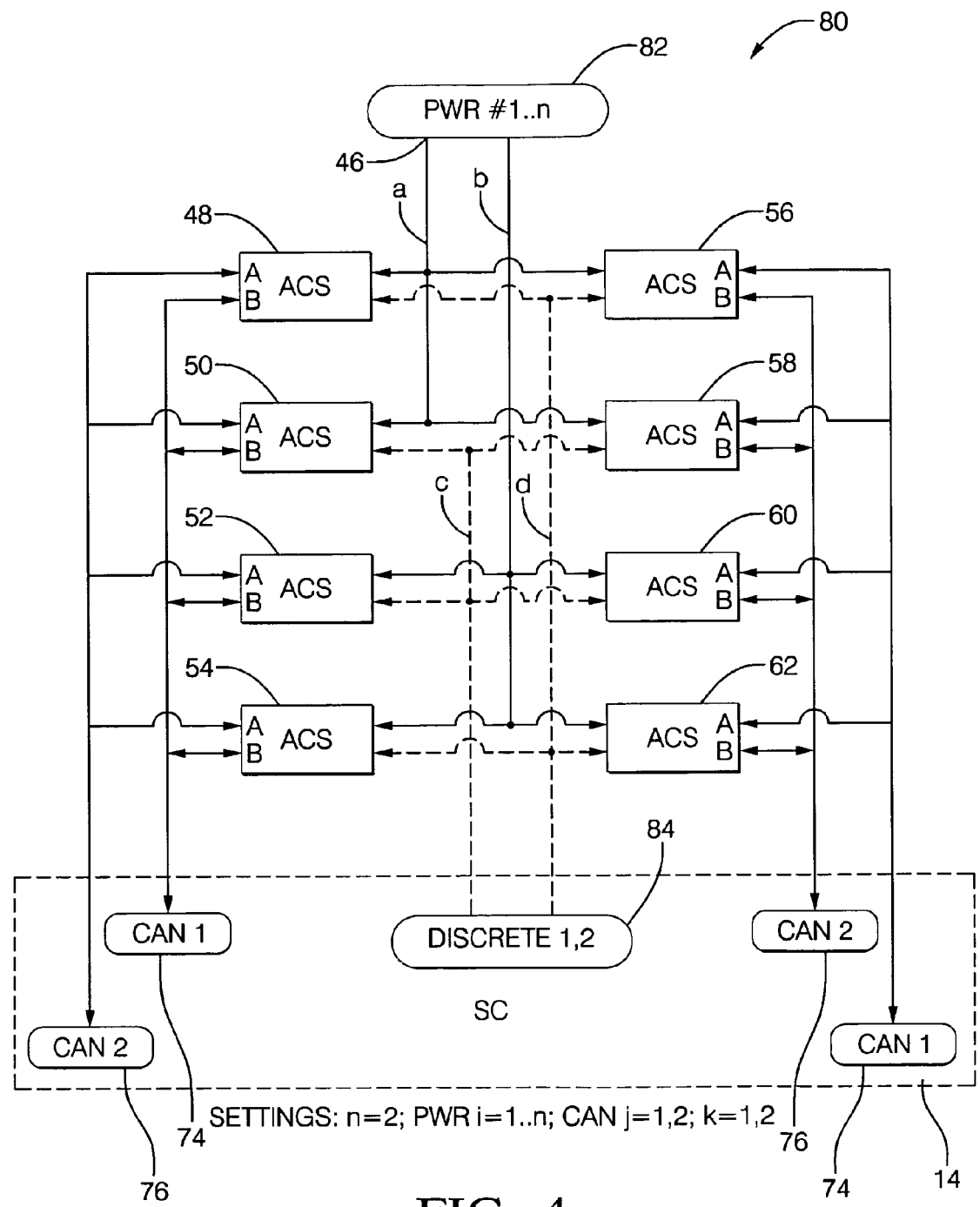
FIG. 4 is a diagrammatic view of yet another embodiment of a brake-by-wire system architecture.

FIGS. 2-4 illustrate examples of architecture that can be used in self-initializing braking systems including eight actuators. Referring to FIG. 2, system architecture 40 includes controller 14 (SC, System Controller) including a network 44 having message identification structure that allows for communication between the controller 14 and the actuators 48, 50, 52, 54, 56, 58, 60 and 62. While network 44 is illustrated as two, separate components, it is actually single component, although multiple networks can be used. The controller 14 is connected to a power source 42 having multiple outputs 46 (eight, as shown) each connected to a respective actuator 48, 50, 52, 54, 56, 58, 60 and 62. The controller and the power source are linked by a communication network to transfer control signals as needed for the operations described herein.

System architecture 40 includes logic enabling the controller 14 to identify and assign a unique identifier to each of the actuators 48, 50, 52, 54, 56, 58, 60 and 62 by specific routing of the power source 42 and configuration messages to each actuator 48, 50, 52, 54, 56, 58, 60 and 62. Controller 14 can selectively poll each actuator 48, 50, 52, 54, 56, 58, 60 and 62 via the power source 42 and network 44.

In some embodiments, controller 14 may signal the power source 42 through network 44 to energize a particular actuator. For example, to identify actuator 48, controller 14 can signal power source 42 via network 44 to energize actuator 48 along line a (i=1). Once the actuator 48 is energized, controller 14 can signal the actuator (by sending a confirmation message to actuator 48) and, as will be described in greater detail below, the actuator 48 can signal the controller 14. Once actuator 48 is identified, the controller 14 can signal power source 42 via network 44 to energize actuator 50 along line b (i=2). Once the actuator 50 is energized, controller 14 can signal actuator 50 (by sending a confirmation message to actuator 50) and actuator 50 can signal the controller 14. The process can be repeated using lines c-h until each actuator 48, 50, 52, 54, 56, 58, 60 and 62 is identified. In other embodiments, a separate network (not shown) may facilitate communication between the controller 14 and power source 42. In some cases, other hardware may signal power source 42 to selectively energize a particular actuator 48, 50, 52, 54, 56, 58, 60 and 62 and controller 14 can selectively transmit the configuration messages. In these cases, controller 14 and the other hardware may be capable of communicating with each other.

The configuration messages include a first configuration message that asks the actuators 48, 50, 52, 54, 56, 58, 60 and 62 to go into a network identification programming mode and a second configuration message that includes the desired network identifier. Each actuator 48, 50, 52, 54, 56, 58, 60 and 62, upon receipt of the first configuration message and entering the programming mode, sends a request configuration received message back to the controller 14 through network 44 indicating the actuator's location. Once the request configuration received message is received by the controller 14, the second configuration message is sent from the controller to the respective actuator having a primary identifier. The primary identifier is indexed to the respective actuator and is programmed into a non-volatile memory location.

Table I, below, contains an example of an identification sequence and assigned primary identifiers (CAN ijk ID) for the embodiment of FIG. 2. Other sequences are possible and Table I should not be construed as limiting.

TABLE I

Eight Power Outlets

| ACS | PWR # | CAN ijk ID |
|-----|-------|------------|
| 48  | 1     | 1          |
| 50  | 2     | 2          |
| 52  | 3     | 3          |
| 54  | 4     | 4          |
| 56  | 5     | 5          |
| 58  | 6     | 6          |
| 60  | 7     | 7          |
| 62  | 8     | 8          |

FIG. 3 illustrates an alternative system architecture 70 that includes a power source 72 having four outlets 46, with each outlet 46 allowing communication with two of the actuators 48, 50, 52, 54, 56, 58, 60 and 62. The system architecture 70 includes multiple networks 74 and 76 connected to each actuator 48, 50, 52, 54, 56, 58, 60 and 62 at respective channels A and B. Network 74 is connected to actuators 48, 50, 52 and 54 at channel B and to actuators 56, 58, 60 and 62 at channel A, while network 76 is connected to actuators 48, 50, 52 and 54 at channel A and to actuators 56, 58, 60 and 62 at channel B.

Controller 14 may signal the power source 72, e.g., through network 74, 76 to energize a pair of actuators connected to a respective lines a, b, c, d. Once a pair of actuators are energized, the controller 14 can selectively send a signal including configuration messages to a particular actuator by selecting a given network and channel. For example, to identify actuator 48, controller 14 can signal power source 72 via network 74 to energize actuators 48 and 56 along line a (i=1). Once the actuators 48, 56 are energized, controller 14 can signal actuator 48 by communicating via channel B of network 74 or channel A of network 76 and can signal actuator 56 via channel A of network 74 or channel B of network 76.

Once actuators 50 and 58 are identified and their respective primary identifier is indexed and programmed into a non-volatile memory location, the controller 14 can signal power source 72, e.g., via network 74, 76 to energize actuators 50 and 58 along line b (i=2). Once the actuators 50, 58 are energized, controller 14 can signal actuator 50 by communicating via channel B of network 74 or channel A of network 76 and can signal actuator 58 via channel A of network 74 or channel B of network 76. The process can be repeated using lines c and d until each actuator 48, 50, 52, 54, 56, 58, 60 and 62 is identified.

Table II, below, contains an example of an identification sequence and assigned primary identifiers (CAN ijk ID) for the embodiment of FIG. 3. Other sequences are possible and Table II should not be construed as limiting.

TABLE II

Four Power Outlets

| ACS | PWR # | CAN 1 | CAN ijk ID |
|-----|-------|-------|------------|
| 48  | 1     | B     | 1          |
| 50  | 4     | B     | 2          |
| 52  | 2     | B     | 3          |
| 54  | 3     | B     | 4          |
| 56  | 1     | A     | 5          |
| 58  | 4     | A     | 6          |
| 60  | 2     | A     | 7          |
| 62  | 3     | A     | 8          |

Referring now to FIG. 4, another alternative system architecture 80 includes a power source 82 having two outlets 46, with each outlet 46 allowing communication with four of the actuators 48, 50, 52, 54, 56, 58, 60 and 62. The system architecture 80 includes multiple networks 74 and 76 connected to each actuator 48, 50, 52, 54, 56, 58, 60 and 62 at respective channels A and B. Network 74 is connected to actuators 48, 50, 52 and 54 at channel B and to actuators 56, 58, 60 and 62 at channel A, while network 76 is connected to actuators 48, 50, 52 and 54 at channel A and to actuators 56, 58, 60 and 62 at channel B.

Controller 14 may signal the power source 72, e.g., through network 74, 76 to energize a four actuators connected to respective lines a and b. Once the four actuators are energized, the controller 14 can selectively send a signal including configuration messages to a pair of the energized actuators by selecting a given network and channel. A discrete signal generator 84 is capable of sending a discrete signal along lines c and d to actuators 50, 52, 58, 60 and along line d to actuators 48, 54, 56, 62. The discrete signal is used in identifying a single actuator and can be generated by any component capable of providing a discrete TRUE/FALSE signal independent of the networks.

Table III, below, contains an example of an identification sequence and assigned primary identifiers (CAN ijk ID) for the embodiment of FIG. 4. Other sequences are possible and Table III should not be construed as limiting.

TABLE III

Two Power Outlets

| ACS | PWR # | CAN 1 | Discrete | CAN ijk ID |
|-----|-------|-------|----------|------------|
| 48  | 1     | B     | 2        | 1          |
| 50  | 1     | B     | 1        | 2          |
| 52  | 2     | B     | 1        | 3          |
| 54  | 2     | B     | 2        | 4          |
| 56  | 1     | A     | 2        | 5          |
| 58  | 1     | A     | 1        | 6          |
| 60  | 2     | A     | 1        | 7          |
| 62  | 2     | A     | 2        | 8          |

Figure 5:
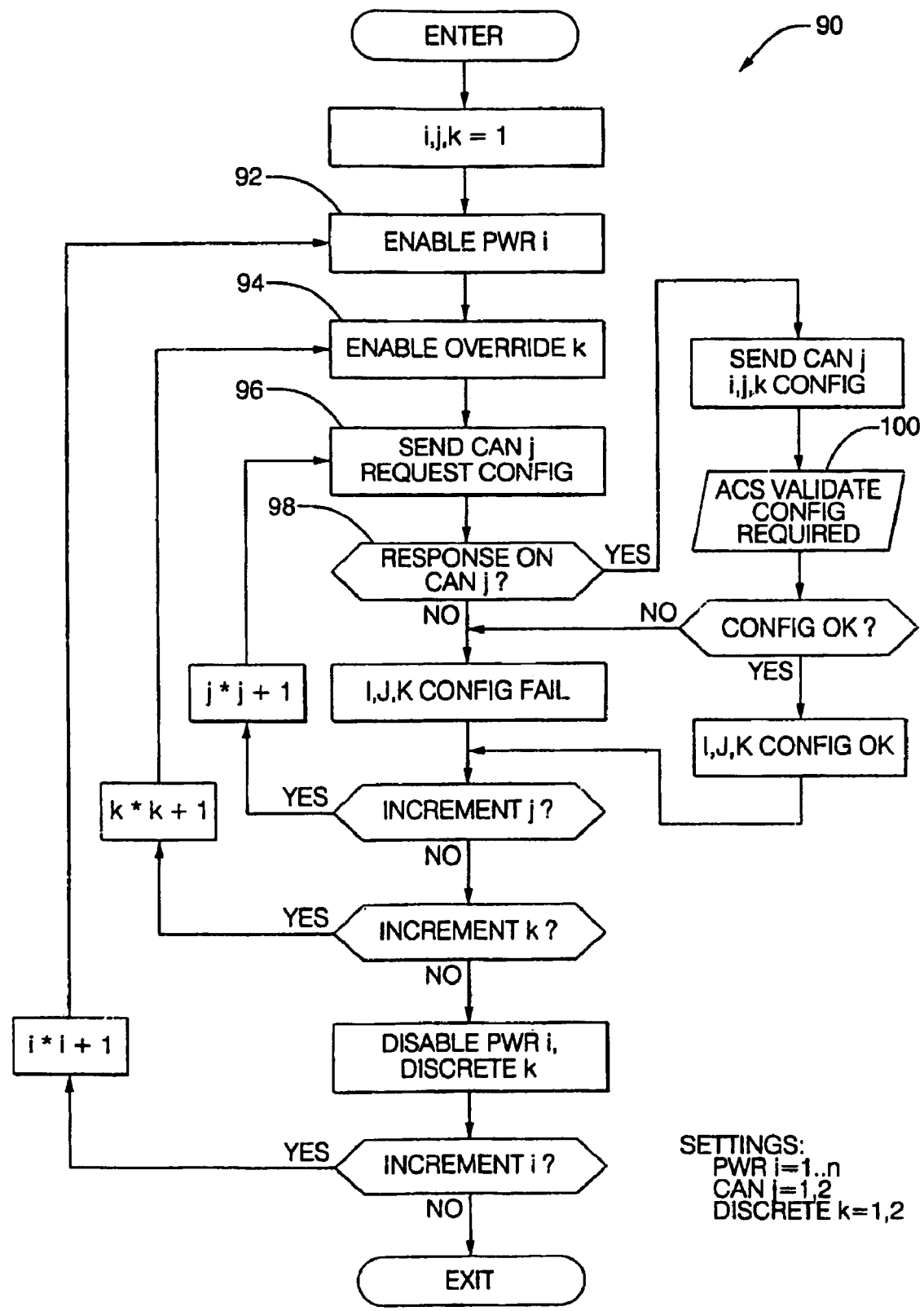
FIG. 5 is a flow diagram of an embodiment of a brake-by-wire system initialization process.

Referring to FIG. 5, a process 90 for identifying and dynamically assigning identifiers to actuators of a brake-by-wire system is shown using, for example, any of the architectures 40, 70 and 80 of FIGS. 2-4. Power is enabled to one or more of the actuators 48, 50, 52, 54, 56, 58, 60 and 62 through a power outlet 46 (e.g., i=1), e.g., as described above with respect to FIGS. 2-4, at a power-enabling step 92. If applicable, the discrete signal generator 84 (k=1) is enabled, sending a discrete signal to respective actuators 48, 50, 52, 54, 56, 58, 60 and 62 at step 94 (see FIG. 4). At step 96, a first configuration message (request configuration message) is sent from the controller 14 through the desired network (j=1) to a respective actuator 48, 50, 52, 54, 56, 58, 60, 62 to place the actuator 48, 50, 52, 54, 56, 58, 60, 62 in its network identification programming mode. If the respective actuator 48, 50, 52, 54, 56, 58, 60, 62 replies to the request configuration message at the reply step 98 by sending a locating signal (request configuration received message) back to the controller 14, a second configuration message is sent to the respective actuator 48, 50, 52, 54, 56, 58, 60, 62 that includes the desired network identifier. If no message is received from the respective actuator 48, 50, 52, 54, 56, 58, 60, 62 or if multiple messages from multiple actuators are received, an error is recognized.

Figure 6:
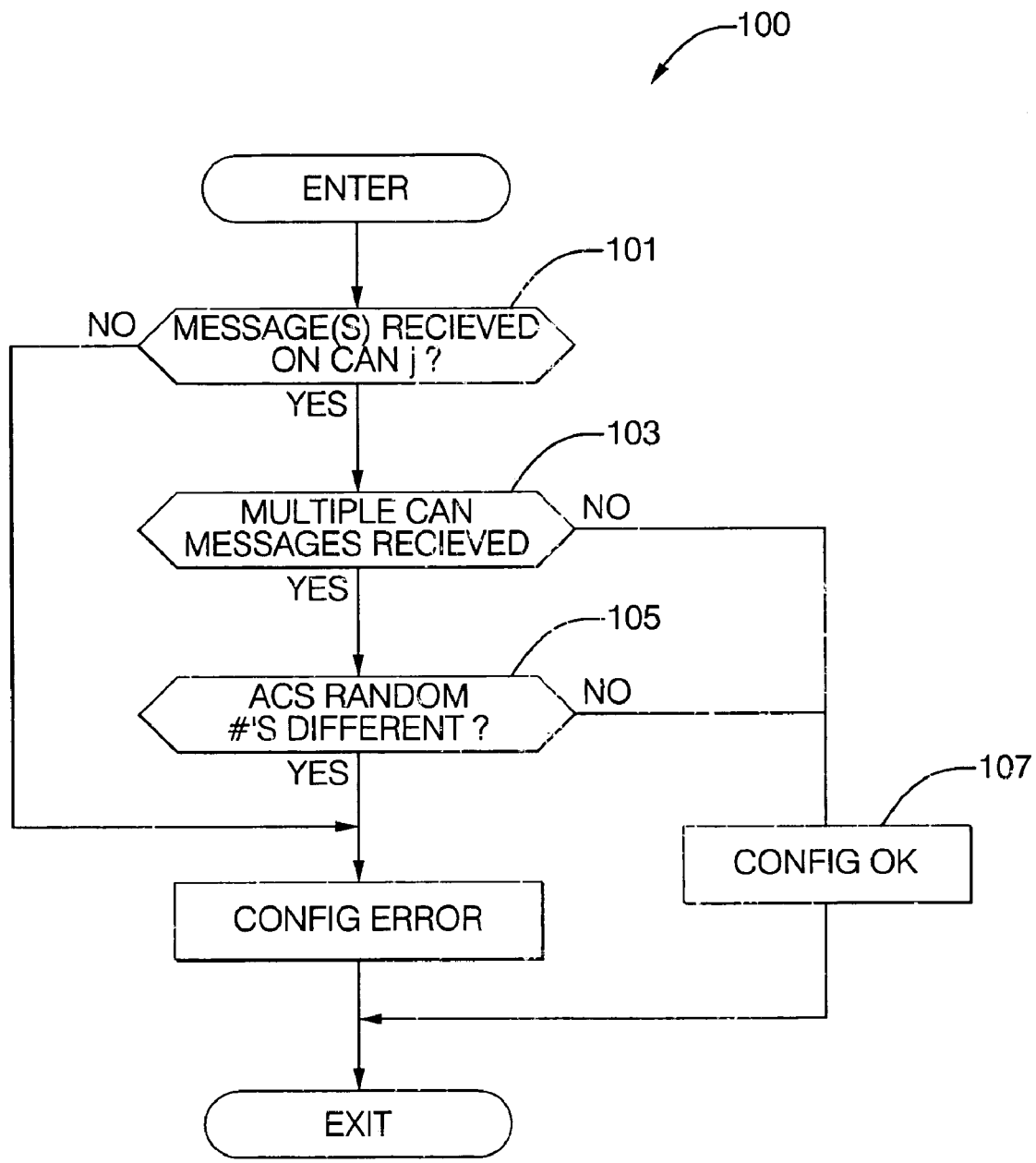
FIG. 6 is a flow diagram of an embodiment of a validation sequence.

In cases where a reply is received by the controller 14 from the respective actuator 48, 50, 52, 54, 56, 58, 60, 62, a validation sequence 100 begins. Referring to FIG. 6, upon receiving the first configuration message activating the network identification programming mode, the actuator 48, 50, 52, 54, 56, 58, 60, 62 generates a random number and relays the generated random number to the controller 14 during the reply step 98. The reply and random number are received by the controller 14 at step 101. If the controller 14 receives multiple responses to the first configuration message, see steps 103 and 105, each including a different random number, an error is detected. If the random numbers are identical or if there is a single reply message from the actuator 48, 50, 52, 54, 56, 58, 60, 62, the response is validated, see step 107, and the actuator 48, 50, 52, 54, 56, 58, 60, 62 is assigned a primary identifier. Referring back to FIG. 5, the process 90 is repeated (j=j+1, k=k+1 and i=i+1) until each actuator 48, 50, 52, 54, 56, 58, 60, 62 is identified and assigned a primary identifier or the process fails. In some embodiments, when an error is detected, the process 90 is halted and a fault message is generated. In other embodiments, the process 90 continues to attempt to identify and assign primary identifiers to actuators 48, 50, 52, 54, 56, 58, 60, 62 or the process 90 is retried.

Figure 7:
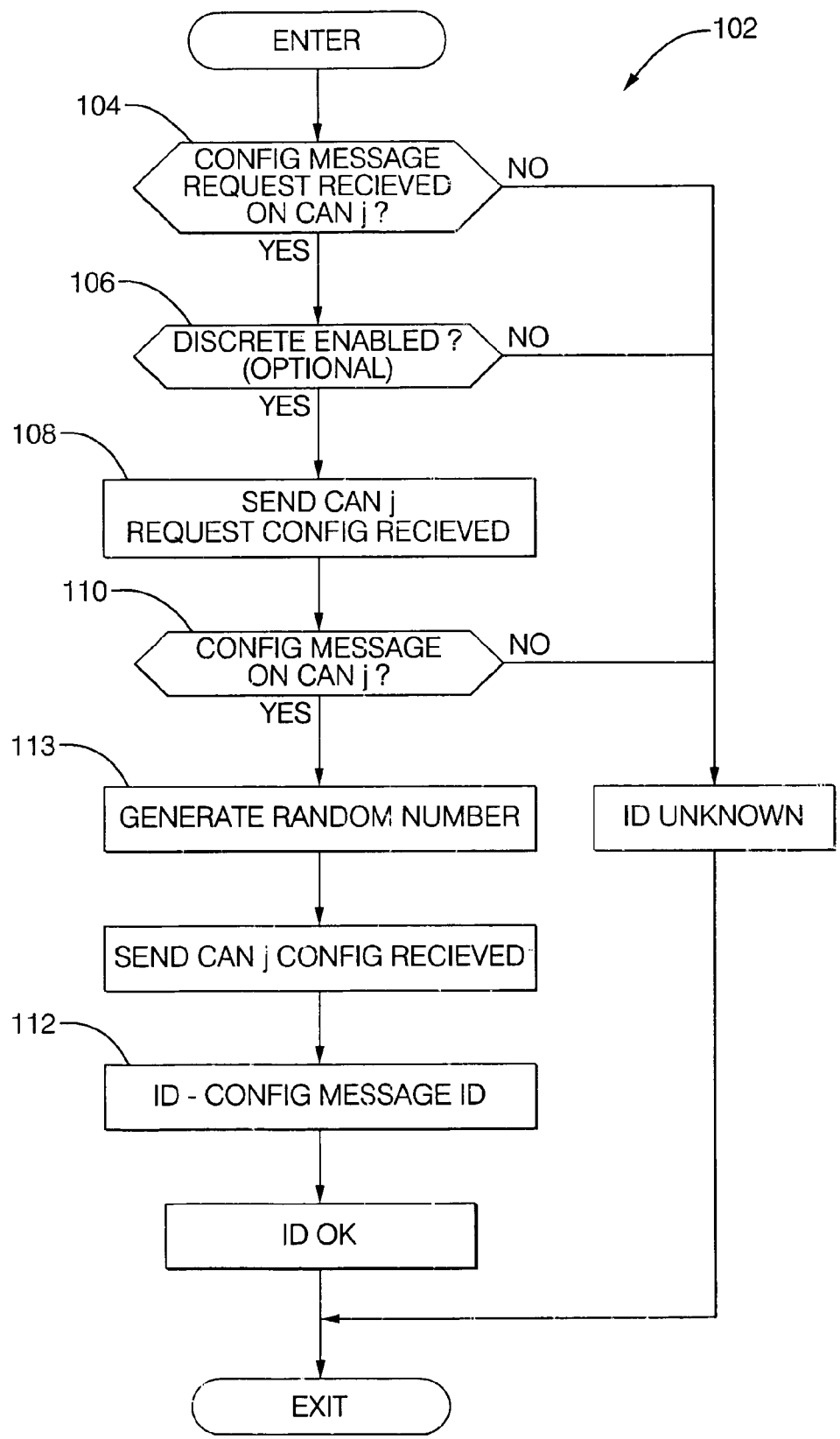
FIG. 7 is a flow diagram of an embodiment of an actuator configuration process.

Referring now to FIG. 7, an actuator configuration process 102 begins with an actuator 48, 50, 52, 54, 56, 58, 60, 62 looking for and/or receiving a first configuration message (e.g., request configuration message) on the network at step 104. Optionally, in certain embodiments such as the embodiment of FIG. 4, a discrete signal may be received from the controller 14, see step 106. If the actuator 48, 50, 52, 54, 56, 58, 60, 62 receives no discrete signal, then no primary identifier is assigned to the actuator 48, 50, 52, 54, 56, 58, 60, 62 during the process. If the actuator 48, 50, 52, 54, 56, 58, 60, 62 receives a discrete signal, the actuator 48, 50, 52, 54, 56, 58, 60, 62 replies with a request configuration received/locator message at step 108 that is received by the controller 14. The actuator 48, 50, 52, 54, 56, 58, 60, 62 then looks for and/or receives a second configuration message on the network including a primary identifier at step 110. If the second configuration message is received then a random number is generated at step 113 and sent back to controller 14 in the configuration received message. The primary identifier is indexed to the actuator and saved in memory at step 112, as noted above.

The above-described self-initiating braking systems allow for in-place, dynamic initialization of multiple actuators (e.g., after the vehicle is fully assembled with the actuators connected to the desired wheels suitable for use during a braking operation). This may eliminate any need for certain pre-programming of the actuators (e.g., using separate software for each actuator), color-coding of braking components, and/or maintaining separation of the braking components in an attempt to reduce the possibility of incorrect braking system setup leading to errors, which may also lead to a reduction in cost. The self-initializing braking system can also be used in fully brake-by-wire vehicles including aircraft. While the description above primarily describes a brake-by-wire system, the self-initialization method described can be used with any system which uses a master controller which sends commands to smart actuators including non brake related systems. Additionally, other message structures or variations on the above described message structures can be utilized to effectuate initialization.

A number of detailed embodiments have been described. Nevertheless, it will be understood that various modifications may be made. For example, while eight actuators 48, 50, 52, 54, 56, 58, 60, 62 have been primarily described with reference to FIGS. 2-4, controllable, self-initializing brake systems can include less than eight actuators, such as two, three, four, five, six or seven actuators, or more than eight actuators, such as ten, twelve, fourteen, sixteen or eighteen actuators, or more. In some embodiments, there may be the same number of actuators as the number of wheels. In other embodiments, there may be more actuators than the number of wheels, such as in cases where a single wheel or multiple wheels of the vehicle includes more than one actuator. Self-initializing brake systems may further include more than one controller. For example, a first architecture including a first controller, such as any of those described above, may be dedicated to a first set of actuators and a second architecture including a second controller, such as any of those described above, may be dedicated to a second set of actuators. In some embodiments, the brake system 12 may dynamically assign a primary identifier to at least one or more of the braking actuators after only one or more, but not all, of the braking actuators are connected to the controller. Accordingly, other embodiments are within the scope of the following claims.

What is claimed is:

1. A method of initializing a brake-by-wire system, the method comprising:
    connecting multiple braking actuators to a controller to allow for communication between the braking actuators and the controller, the braking actuators being associated with one or more wheels of a vehicle;
    energizing the braking actuators in multiple power-enabling steps, the controller signaling a power source during a first power-enabling step to energize only some or one of the braking actuators by sending a first individual activation signal from the power source to the only some or one of the braking actuators during the first power-enabling step and the controller signaling the power source during a second power-enabling step to energize only some or one of the other braking actuators by sending a second individual activation signal from the power source to the only some or one of the other braking actuators during the second power-enabling step, the second individual activation signal sent from the power source being separate from the first individual activation signal sent from the power source; and
    assigning a primary identifier to the only some or one of the braking actuators using the controller after the associated power-enabling steps.

2. The method of claim 1, wherein the controller routes signals to the braking actuators using the primary identifiers assigned to the respective braking actuators.

3. The method of claim 1 further comprising providing a network to facilitate communication between the controller and braking actuators.

4. The method of claim 3, wherein the network includes message identification structure.

5. The method of claim 3, wherein the step of providing the network includes providing multiple networks to facilitate communication between the controller and braking actuators.

6. The method of claim 1, wherein the step of assigning a primary identifier to the energized braking actuators occurs subsequent to assembling or maintaining the vehicle, wherein the steps of assembling or maintaining the vehicle each includes connecting the actuators to the wheels for use during a braking operation.

7. The method of claim 1, wherein the step of assigning a primary identifier to the energized braking actuators includes sending a first configuration message to a respective energized braking actuator.

8. The method of claim 7, wherein the step of assigning a primary identifier to the energized braking actuators includes signaling the controller upon receipt of the first configuration message by the respective energized braking actuator.

9. The method of claim 8, wherein the respective energized braking actuator generating a random identification in response to receipt of the first configuration message and sending the random identification to the controller.

10. The method of claim 1 comprising connecting the braking actuators to the power source.

11. The method of claim 10, wherein the power source includes multiple outlets, with each outlet being dedicated to one or more actuator, the respective only some or one braking actuators being selectively energized through use of only one outlet.

12. The method of claim 11, wherein the controller is configured to send a discrete signal to a respective actuator.

13. The method of claim 1 further comprising saving the primary identifier in memory.

14. A brake-by-wire system for a vehicle including wheels and one or more braking actuators associated with one or more of the wheels, the brake-by-wire system comprising:
a first braking actuator;
a second braking actuator;
a power source connected to the first and second braking actuators; and
a controller connected to the power source, the controller configured to selectively identify the first and second braking actuators using the power source and assign a primary identifier to each of the first and second braking actuators for use in selectively controlling the first and second braking actuators;
wherein the controller signals the power source to energize the first actuator during a first power-enabling step by sending a first individual activation signal to the first actuator and then the controller signals the power source to energize the second actuator during a second power-enabling step by sending a second individual activation signal to the second actuator, the second individual activation signal sent by the power source to the second actuator being separate from the first individual activation signal sent by the power source to the first actuator.

15. The brake-by-wire system of claim 14 further comprising a network allowing for communication between the controller and the first and second braking actuators.

16. The brake-by-wire system of claim 15, wherein the network includes message identification structure.

17. The brake-by-wire system of claim 15 further comprising a first network connected to the first actuator at a first communication port and a second network connected to the first actuator at a second communication port different from the first communication port.

18. The brake-by-wire system of claim 14, wherein the power source includes multiple outlets where a first outlet connects the first actuator to the power source and a second outlet connects the second actuator to the power source.

19. The brake-by-wire system of claim 14, wherein the power source includes a first outlet connecting each of the first actuator and a third actuator to the power source and a second outlet connecting the second actuator to the power source.

20. The brake-by-wire system of claim 14 comprising four or more braking actuators connected to the power source, the controller configured to selectively identify each of the four or more braking actuators using the power source and assign a primary identifier to each of the first and second braking actuators for use in selectively controlling the four or more braking actuators.

* * * * *